United States Patent [19]

Steinhauser

[11] Patent Number: 4,598,583
[45] Date of Patent: Jul. 8, 1986

[54] METERING CELL

[76] Inventor: Eberhard Steinhauser, Hansjakobstr. 13, D-7741 Vöhrenbach 1, Fed. Rep. of Germany

[21] Appl. No.: 558,498

[22] Filed: Dec. 6, 1983

[51] Int. Cl.⁴ .................. G01F 5/00; G01F 15/14
[52] U.S. Cl. ............................. 73/202; 73/273
[58] Field of Search .......... 73/861.79, 861.81, 861.87, 73/861.88, 272 R, 273, 202, 203, 254; 235/94; 220/306, 11

[56] References Cited

U.S. PATENT DOCUMENTS

| | | | |
|---|---|---|---|
| 673,431 | 5/1901 | Fredrick | 73/861.09 |
| 1,620,151 | 3/1927 | Bassett | 73/254 |
| 2,620,659 | 9/1952 | Karcz | 73/203 |
| 3,021,710 | 2/1962 | Barrere et al. | 73/861.87 |
| 3,068,696 | 12/1962 | Smith et al. | 73/273 |
| 3,156,115 | 11/1964 | Adelmann | 235/94 |
| 4,037,748 | 7/1977 | Stubbs, Jr. | 220/306 |
| 4,111,329 | 9/1978 | Lampman | 220/306 |
| 4,182,175 | 1/1980 | Boehringer | 73/861.81 |
| 4,391,139 | 7/1983 | Sutherland | 73/273 |

Primary Examiner—Herbert Goldstein
Attorney, Agent, or Firm—Donald Brown; Robert T. Gammons

[57] ABSTRACT

A meter comprising a receptacle and cover structured to receive, respectively, a metering component and a registering component and provided with forcibly interengageable internally non-accessible latching elements which inhibit disengagement of the cover from the receptacle after assembly.

5 Claims, 4 Drawing Figures

METERING CELL

BACKGROUND OF THE INVENTION

This invention refers to a metering cell for metering the flow of fluids including a metering component and a register component.

Such a flowmeter for metering fluids including a register casing and a turbine casing element is known from the DE No. 2 442 100. In this flowmeter the register casing is mounted to the turbine casing element by sliding two retaining wings provided at the hood of the register casing over pins provided at the wall of the turbine casing element and securing the retaining wings by means of connecting elements such as rivets or screws passing through respective holes. Such a connection requires a considerable effort in manufacture of the casing parts as well as in assembling.

OBJECTS OF THE INVENTION

It is the object of the invention to provide a metering cell of the above mentioned kind allowing the connection of the metering component with the register component to be done in a simple manner and not requiring a complex design of one or both components.

SUMMARY OF THE INVENTION

In accordance with the invention the metering cell for metering the flow of fluids includes a metering component and a register component designed such that the metering component and the register component are connectable by a latching snap connection. According to a preferred embodiment the snap connection may be designed such that it simultaneously allows for mutual centering of both components and/or prevents the connection from being disengaged from the exterior.

The inventive design of the metering cell is suited for wet-dial water meters as well as for dry-dial water meters. In a dry-dial water meter the metering component, which is acted upon by the fluid pressure, is separated from the register component by a pressure plate. In this case the inventive snap connection may be provided at the pressure plate for mounting the metering component as well as the register component. The metering cell is mounted to a casing having an inlet and an outlet preferably by means of a clamping nut engaging the pressure plate and surrounding the metering element.

BRIEF DESCRIPTION OF THE DRAWINGS

The invention is hereinafter more particularly described with reference to an embodiment shown in the accompanying drawings. In the drawings.

Figure 1:
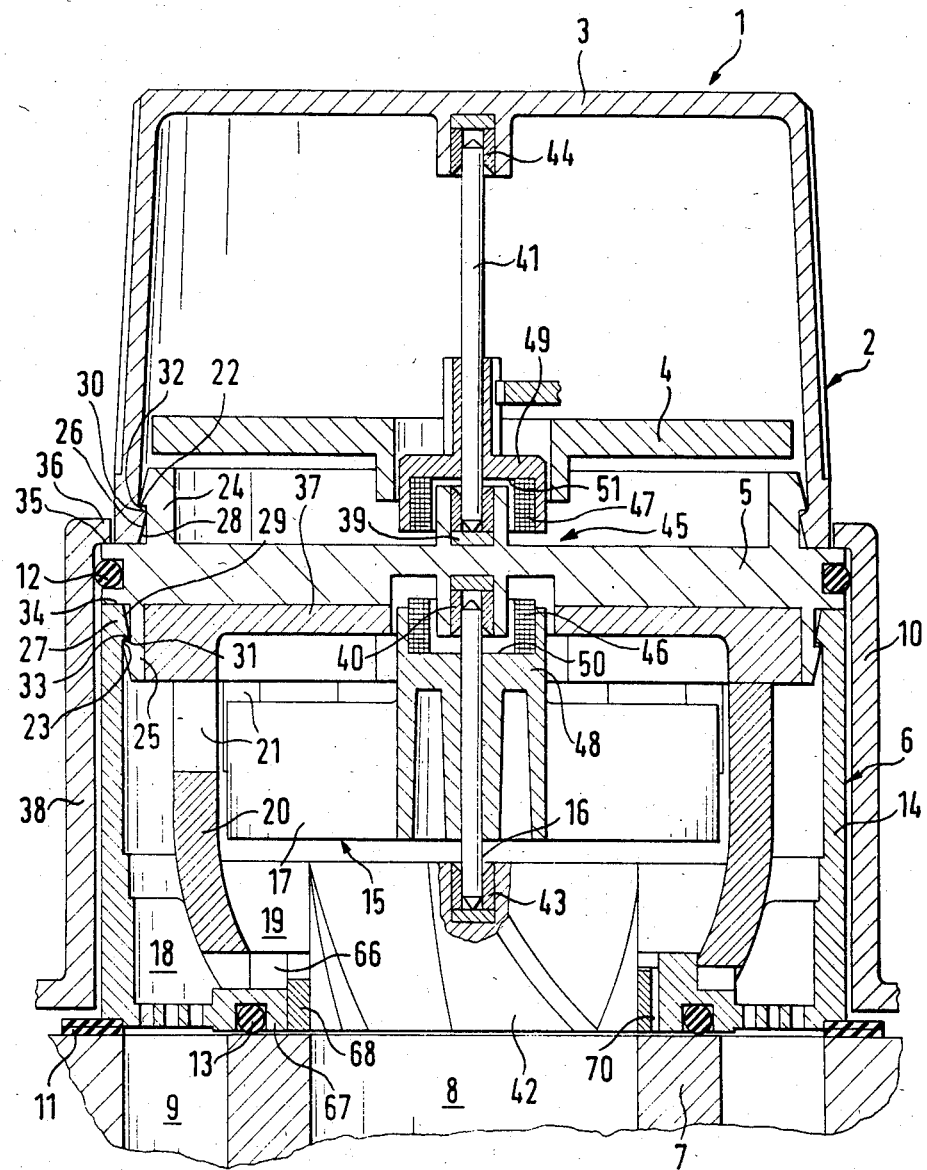
FIG. 1 shows a plan view of a sectional representation of the inventive metering cell.

The metering cell 1 shown in FIG. 1 comprises a register component 2 with a register cover 3 and a lower supporting plate 4, a pressure plate 5 and a metering component 6. The metering component 6 is put on a housing 7 with an outlet channel 8 and an inlet channel 9 annularly surrounding the outlet channel 8 and is retained in this position by the clamping nut 10 in a manner described further below. The inlet channel 9 or the metering component 6, respectively, are sealed towards the exterior by means of the seals 11 and 12, respectively, the inlet channel 9 is sealed from the outlet channel 8 by means of the seal 13.

The metering component 6 comprises an impeller cup or housing 14, an impeller 15 having blades extending radially from the impeller axis 16 and an impeller cup insert 20 disposed between the impeller 15 and the impeller cup 14 and separating the inlet side 18 from the outlet side 19 of the impeller 15. The impeller cup insert 20 has holes 21 provided on its upper portion. Fluid flowing from the inlet channel 9 and the inlet side 18 acts upon the impeller through the holes 21.

The substantially circular pressure plate 5 disposed between the metering component 6 and the register component 2 comprises annular projections 24, 25 being disposed on both end planes of the pressure plate 5 and having peripheral lips 22, 23. An elevation 26 and 27 is formed on the inner side of and close to the free end of the register cover 3 and impeller cup 14, respectively. The width of the elevation 26, 27 substantially corresponds to the distance of the lips 22, 23 from the respective opposite end planes of the pressure plate 5. The elevation 26, 27 is shaped such that the inner diameter of the register cover 3 and the impeller cup 14, respectively, at the free edge thereof and in a distance therefrom corresponding to the distance of the lips 22, 23 from the respective opposite end plane of the pressure plate 5 corresponds to the diameter of the projections 24, 25 measured at the lips 22, 23 and therebetween maximally decreases down to a value corresponding to the outer diameter of the projections 24, 25 in the area between the lips 22, 23 and the opposite end plane of the pressure plate 5. Preferably each of both elevations 26, 27 has a triangular cross-section with a first side adjacent to the outer border of the register cover 3 and the impeller cup 14, respectively, and a second side 30, 31 adjacent thereto. Preferably the second side 30, 31 is formed sloping so steep that the connecting engagement of the lips 22, 23 into the annular recesses 32, 33 of the register cover 3 and the impeller cup 14, respectively, adjacent to the elevations 26, 27 cannot be disengaged from outside.

The end plane of the pressure plane 5 turned towards the impeller cup 14 rests upon the upper border 34 of the impeller cup and the outer diameter of the pressure plate 5 substantially corresponds to the outer diameter of the impeller cup 14. Thus the outer diameter of the annular projection 25 is smaller than the outer diameter of the impeller cup 14 by about the thickness of the elevation 27. The outer diameter of the register cover 3 is slightly smaller than the outer diameter of the pressure plate 5 such that an annular shoulder 35 is formed on the upper side of the pressure plate 5 close to its edge, when the register cover 3 and the impeller cup 14 are connected with the pressure plate 5. The collar 36 of the clamping nut 10 screwed on the housing 7 engages the shoulder 35 such that the pressure plate 5 is retained in its position by means of the clamping nut 10. Since the pressure plate 5 rests upon the upper border 34 of the impeller cup 14, the latter is pressed towards the housing 7 via the seals 11, 13 and the impeller cup insert is retained in its position relative to the impeller cup 14 by means of a finned impact plate 37 provided within the annular projection 25 and resting upon the upper border of the impeller cup insert 20. The inner diameter of the cylindrical section 38 of the clamping nut 10 is preferably selected such that it is only slightly larger than the outer diameter of the impeller cup 14. In this way the clamping nut 10 prevents the impeller cup 14 from expanding or bulging, respectively, and thus the snap connection formed by the lip 23 and the elevation 27 from disengaging by the action of the interior pressure.

The pressure plate 5 consisting preferably of non-magnetic material comprises a bearing 39, 40 for supporting the primary shaft 41 of the register component and the impeller shaft 16, respectively, in the center of both end planes. The other end of the impeller shaft 16 is supported in a bearing provided in a spiral 42. The spiral 42 is designed such that fluid flowing through the outlet channel 8 backward towards the impeller 15 rotates the impeller 15 in the same sense of rotation as fluid flowing from the inlet channel 9 to the impeller 15. This assures a flowmetering even with backwards flowing fluids. The free end of the primary shaft 41 is supported in a bearing 44 provided at the register cover 3.

Figure 4:
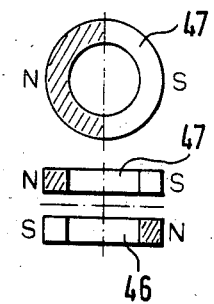
FIG. 4 shows a plan view and a sectional side view of a magneto coupling used for the torque transmission from the metering component to the register component.

The torque transmission from the impeller shaft 16 to the primary shaft 41 is performed via the magneto coupling 45 comprising a first annular magnet 46 connected with the impeller shaft 16 and a second annular magnet 47 connected with the primary shaft 41. The arrangement and polarity of the annular magnets 46, 47 is clarified in FIG. 4. Both of the annular magnets 46, 47 have a north magnetic pole and a south magnetic pole rotationally staggered therefrom by 180°. If these magnets are mounted to aligned axes 16, 41 such that their end planes are parallel to each other, then the magnetic forces acting between both annular magnets 46, 47 effect the pole configuration shown in the lower part of FIG. 4. In order to connect the annular magnets 46, 47 with the respective axes 16, 41 shaped parts 48 and 49, respectively, are provided, having opposing cylindrical recesses 50, 51 for receiving the annular magnets 46, 47. It is the particular advantage of the annular magnets besides of the simple operation or handling that the bearings 39, 40 may be disposed in the cylindrical interior of the annular magnets 47, 46, which allows to bring the end planes of the annular magnets 46, 47 into a smallest possible distance being only determined by required strength of the pressure plate 5.

Figure 2:
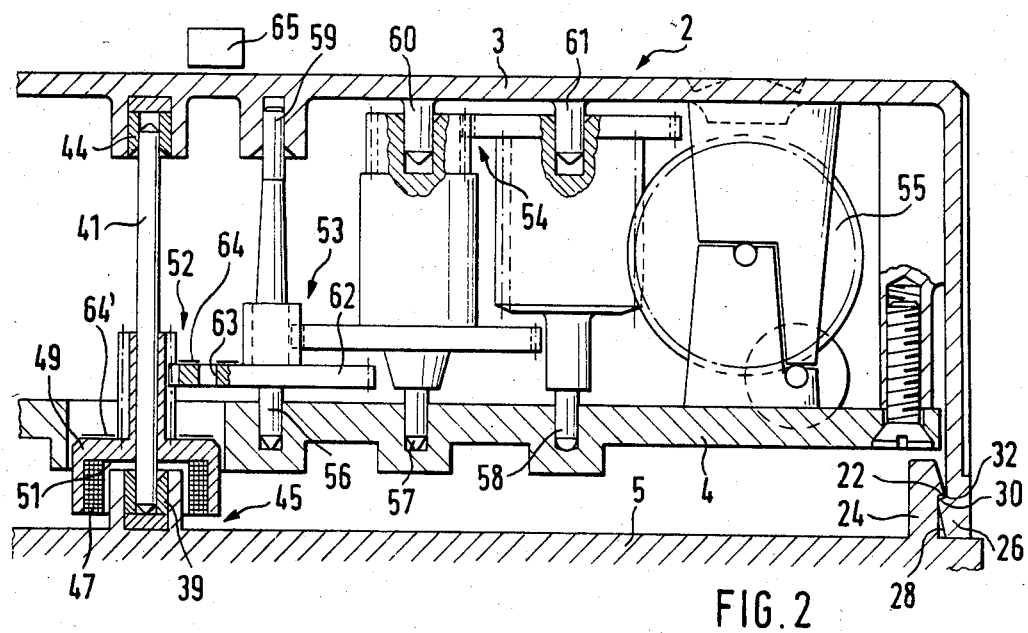
FIG. 2 shows a section through the register element of the inventive metering cell.

In FIG. 2 the register component of the inventive metering cell is shown in an enlarged sectional view. Parts corresponding to those already described in connection with FIG. 1 are characterized in FIG. 2 by identical reference numerals. The rotation of the impeller shaft 16 transmitted via the magneto coupling 45 to the primary shaft 41 is further transmitted by a series of gear stages 52, 53, 54 to a display roll 55. Bearings 56, 57, 58, 59 and pins 60, 61 are provided for supporting the gear stages at the register cover 3 and in the lower supporting plate 5, respectively. In order to prevent the register component from being stopped by acting thereupon for the exterior the register cover 3 is designed stiff in such a manner that a distortion or deformation of the register cover 3 by actions from outside is nearly impossible. In order to indicate the operation and rotational velocity of the primary shaft 41 a hole 63 is provided in the gear 62 required for gearing down the rotational movement and the register cover 3 is formed optically transparent at a point above the hole 63 in a certain angular position of the gear 62. A reflection light barrier 65 disposed at this point above the register cover 3 directs a light ray onto the gear 62 and detects the light reflected by the gear 62. Whenever the hole 63 passes through the light ray the reflected light energy is reduced, whereby the rotational speed of the gear 62 can be measured. In order to increase the contrast differences or to improve the reflection, respectively, the surface of the gear 62 turned towards the reflection light barrier 65 may be provided with a reflecting layer 64, for instance a bright plastics layer or a metallised reflecting layer. It is also possible to provide the element therebelow with a dark layer 64'. Finally, other marks may be provided at the gear 62 or a different gear in place of the hole 63. This eliminates the requirement to provide additional index marks, e.g. star-like or triangular marks, rotating together with the register axes.

Figure 3:
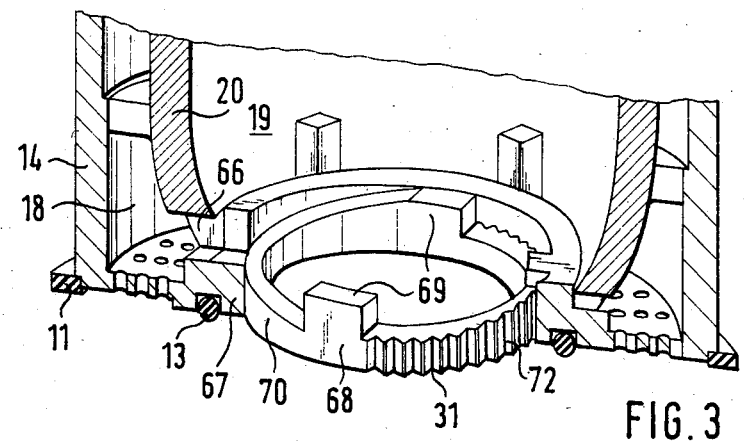
FIG. 3 shows a perspective sectional representation of a part of the metering component.

Adjusting means shown in FIG. 3 are provided for the calibration or adjustment of the metering cell 1. To increase the clarity in FIG. 3 the spiral 42 and the impeller 15 are not shown. The components already described in connection with FIG. 1 are shown having the respective identical reference numerals. The impeller cup insert 20 and a centering element 67 provided at the impeller cup 14 at the corresponding place have a radial hole 66 connecting the inlet side 18 with the outlet side 19.

An adjustment ring 68 is rotatably supported in the centering element coaxially with the impeller shaft 16. The underside of the adjustment ring 68 is disposed in the plane of the underside of the centering element 67 and of the metering component 6, respectively. The adjustment ring 68 has two opposite first sections 69 having an annular height or axial dimension substantially corresponding to the height of the centering element 67 and the distance of the upper edge of the hole 66 from the underside of the centering element 67, respectively. Between both first sections 69 and on its side facing the hole 66 the adjustment ring 68 comprises a helical or spiral second section 70 having an annular height increasing from a smallest value being selected such that the upper side of the ring corresponds to the lower edge of the hole 66 to the annular height at the first sections 69. Preferably the second section 70 has a constant slope such that the cross-section of the hole 66 forming a bypass to the flow through the impeller is linearly variable by turning the adjustment ring 68 and the hole 66 is covered by the adjustment ring 68 to an extent depending linearly on the angular position of the adjustment ring 68. On its side opposing the second section 70 the adjustment ring 68 comprises a third section 71 provided with a serration 72. The serration 72 cooperates with a projection provided at the centering element 67 opposite to the hole 66 to form an engaging connection securing the adjustment ring 68 in a selected angular position. For assembling the metering cell at first the pressure plate 5 is put centrally upon the assembled metering component and in a snapping manner connected thereto by pressing the projection 25 with the lip 23 below the elevation 27. The connection of the register component 2 with the pressure plate 5 is performed correspondingly. For adjusting or calibrating, respectively, of the metering cell assembled in this manner the adjustment ring 68 is brought into an about appropriate position, the metering cell is put onto a housing 7 and passed by a pre-selected fluid mass flow. The resulting rotational speed of the impeller 15 is detected by means of the hole 63 representing the operation indicator and the reflection light barrier 65. The adjustment of the desired rotational speed is thereupon performed by rotating the adjustment ring 68 and thereby the corresponding change of the flow cross-section of the hole 66. By means of the snapping connection of the serration 72 with the centering elements 67 the adjustment ring 68 is retained in the adjusted position. This further allows a reproduceable adjustment of metering cells of the same series without requiring calibration of each individual metering cell. The adjustment ring 68 can further be secured against rotation by sealing the impeller cup 14 and the adjustment ring 68 by non-cutting shaping after the adjustment. After adjustment of the adjustment ring 68 the metering cell 1 is put onto the associated housing 7 and fixed by means of the clamping nut 10.

The snapping connection of the pressure plate 5 and the impeller cup 14 cannot be disengaged when mounted because the clamping nut 10 engages the pressure plate 5. If the inner diameter of the collar 36 is designed such that it about corresponds to the outer diameter of the register cover 3 then also a disengagement of the snapping connection of the register cover 3 with the pressure plate 5 is not possible after putting on the clamping nut 10. The disengagement of the snapping connection may also be prevented already by selecting the second sides 30, 31 of the elevation 26, 27 to be very steep, preferably perpendicular to the projections 24, 25.

I claim:

1. A metering cell for metering the flow of fluids including a metering component and a register component, one of said components comprising an annular projection having a radially extending peripheral lip for engaging a radially-extending elevation defining a recess in the other of said components, said metering component comprising an impeller and adjustment means for adjusting the rotational speed of said impeller, said adjustment means comprising an adjustment ring and a hole forming a bypass with respect to said impeller, said adjustment ring having an angularly increasing height and being rotatably adjustable in that manner that a first section of the adjustment ring covers said hole to an extent depending on the rotational position of said adjustment ring.

2. The metering cell of claim 1, wherein said metering component comprises an impeller cup insert and said hole is disposed radially through said impeller cup insert and said adjustment ring is arranged coaxially with said impeller.

3. The metering cell of claim 1, wherein said first section of said adjustment ring has a linearly increasing annular height.

4. The metering cell of claim 1, wherein said adjustment ring comprises a peripheral serration cooperating with a fixed projection for latchingly securing said adjustment ring in a plurality of angular positions for reproducibly adjusting the rotational speed of said impeller.

5. A metering cell for metering the flow of liquids including a metering component, a register component and a support plate of non-magnetic material disposed between said metering component and said register component, a radial snap connection for connecting said metering component and said register components with said support plate by axially forcing said metering component and said register component towards the support plate, wherein said metering component, said register component and said support plate are formed to be of circular cross section, the outer diameter of said register component being smaller than that of said support plate for forming an outer annular shoulder, said metering cell comprising a clamping nut for fastening said metering cell to a housing, said clamping nut having a radially inwardly-extending annular collar engaging said annular shoulder of said support plate and having an inner diameter corresponding to the outer diameter of said register component for preventing disengagement of said snap connection of said register component with said support plate, said clamping nut comprising a cylindrical section fitting over said metering component to surround said metering component for preventing expansion or bulging thereof.

* * * * *